April 14, 1925.

G. DESENNE 1,533,586

AUTOMATIC RECORDER FOR MACHINE OUTPUT

Filed Jan. 12, 1922   3 Sheets-Sheet 1

Inventor:
G. Desenne
By Lawrence Langner
Attorney

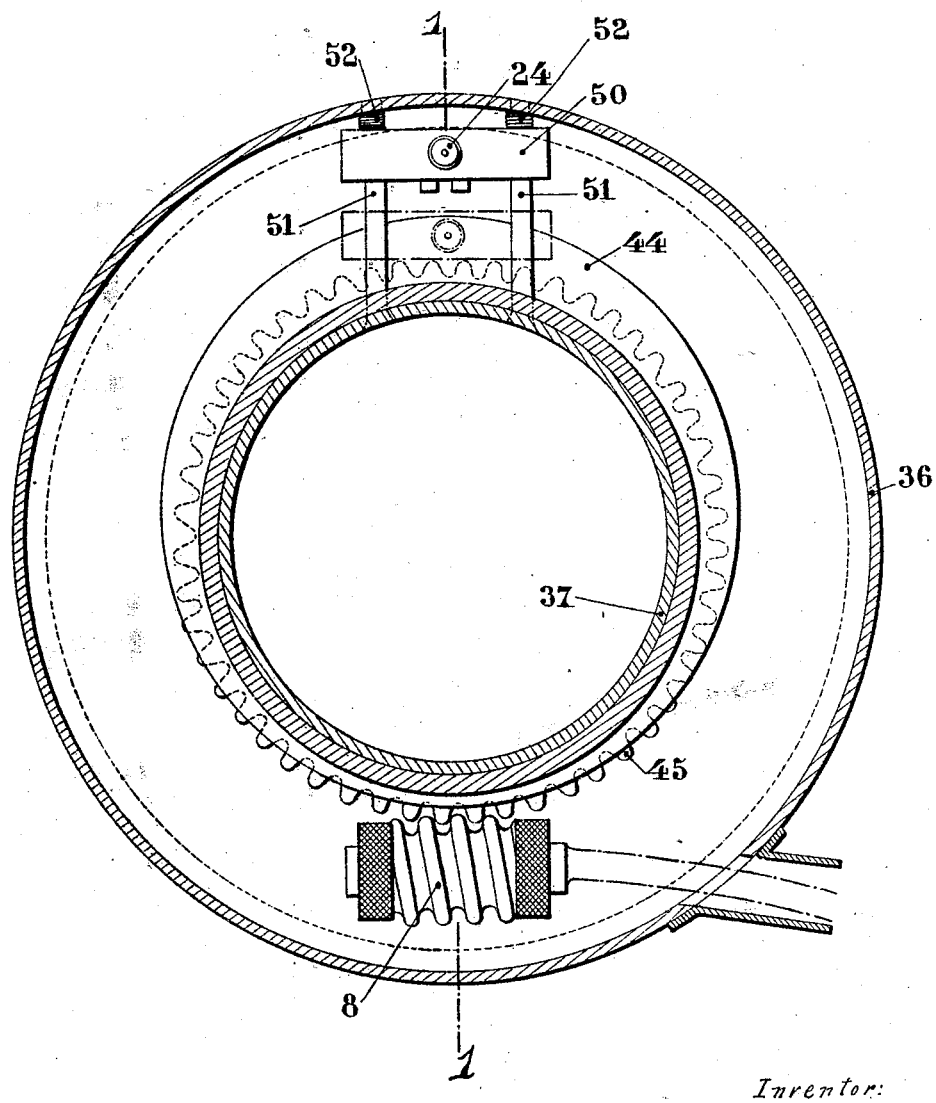

April 14, 1925.  1,533,586
G. DESENNE
AUTOMATIC RECORDER FOR MACHINE OUTPUT
Filed Jan. 12, 1922   3 Sheets-Sheet 3
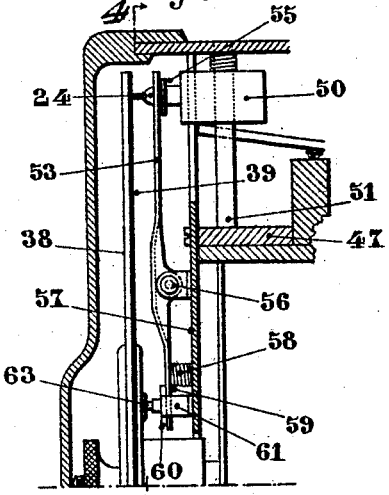
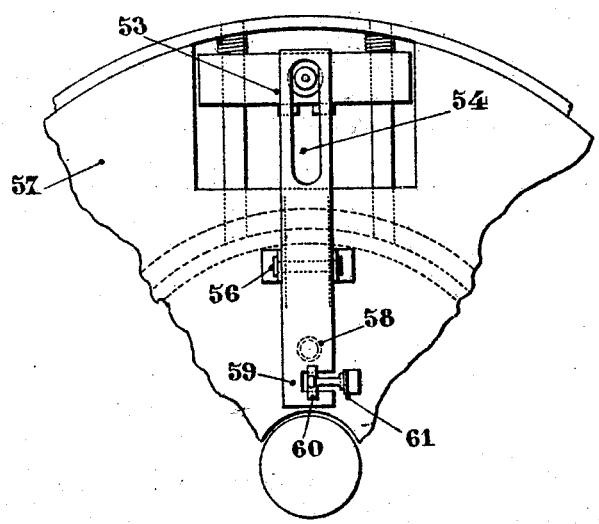
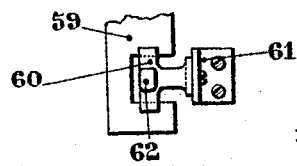
Inventor:
G Desenne
By Lawrence Langner
Attorney Patented Apr. 14, 1925.

1,533,586

UNITED STATES PATENT OFFICE.

GEORGES DESENNE, OF COURBEVOIE, FRANCE.

AUTOMATIC RECORDER FOR MACHINE OUTPUT.

Application filed January 12, 1922. Serial No. 528,742.

*To all whom it may concern:*

Be it known that I, GEORGES DESENNE, a citizen of the French Republic, residing at Courbevoie, Seine, France, 118 Boulevard de Verdun, have invented a new and useful Improvement in Automatic Recorders for Machine Output; and I do hereby declare the following to be a full, clear, and exact description of the same.

This invention relates to furnishing an automatic apparatus to control and record with great accuracy the work of any mechanism. Said apparatus may have various applications, such, for instance, as the following ones:

1st. The apparatus, when mounted upon a motor car, indicates the number of kilometers (or miles) travelled over in a given time, the periods of stopping, the lengths of the forward and backward runs, and any other data necessary for computing the consumption of fuel, the wear and tear on the tires, and, generally, all that is useful for learning the use made of the motor car by the driver, for controlling the running and efficiency of the vehicle, and for ascertaining the cost of travel per kilometer (or mile). Thus applied, the apparatus constitutes an horo-kilometric controlling and recording device.

2nd. Control of the work of a machine tool.

3rd. Realization of a controlling station for the night watchman in factories and working yards.

The apparatus comprises two distinct actuating mechanisms, which are independent from each other, but the actions of which are combined, as will be hereinafter explained, the former mechanism consisting of a shaft transmitting to the apparatus the motion of the car or of the machine to be controlled and the latter mechanism involving a clock work producing uniform movement of a disc upon which the recording takes place.

In the accompanying drawings, a practical embodiment of the invention is illustrated, by way of example.

Figs. 1 and 2 are, respectively, a section on line 1—1 of Fig. 2 and a section on line 2—2 of Fig. 1, of an apparatus designed according to the invention.

Fig. 3 is a section similar to Fig. 1, but comprising a disengaging device intended to automatically remove the pencil from the disc after a predetermined number of hours.

Fig. 4 is a section on line 4—4 of Fig. 3.

Fig. 5 is a separate view of the disengaging device.

Figure 1:
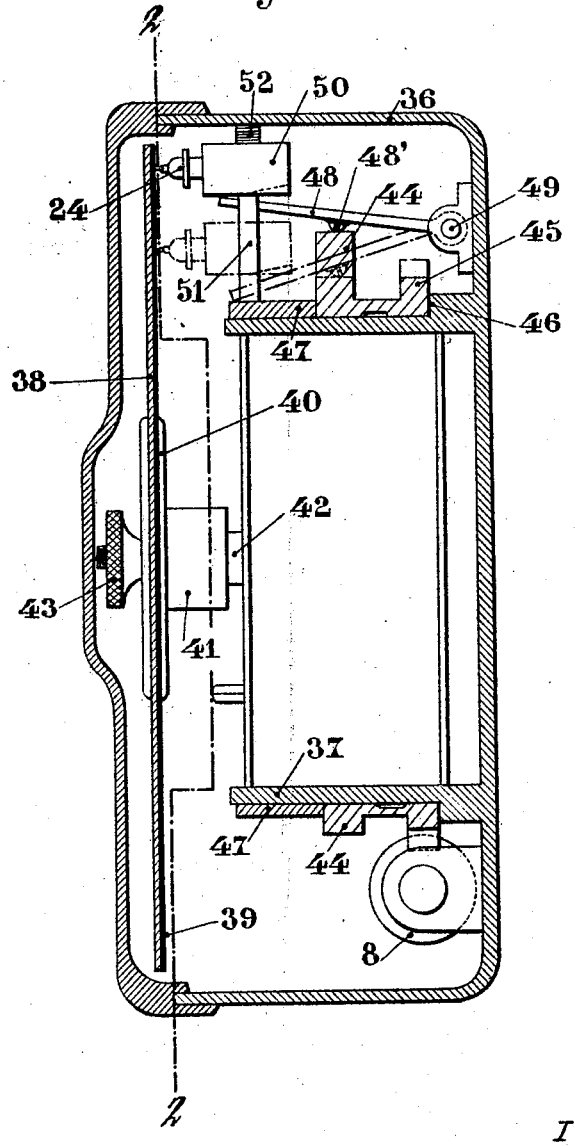

In the embodiment, illustrated in Figs. 1 and 2, a diagram is recorded upon a disc. Moreover, movements of a pencil are imparted by a cam rotating around the axis of rotation of the aforesaid disc, said cam being integral with a pinion actuated by a worm connected by a flexible shaft, or any other suitable means, with the machine to be controlled. Thus is realized an apparatus having a lesser bulk and a number of parts than in former devices.

A case 36 contains a box 37, in which is located a clock work (not shown) which imparts to a disc 38 a uniform rotary motion. Upon the inner face of the disc is applied a circular paper sheet 39, to receive the diagram drawn by a pencil 24, and is maintained in position in any suitable manner enabling the sheet to be readily changed, and for instance, as shown in Fig. 1, by means of a flange 40, pressed against a shoulder 41 of a shaft 42, by a nut 43.

The box 37 is of cylindrical shape and its external surface, carefully machined true, forms a trunnion for a cam and pinion device 44, 45, which is mounted with an easy sliding fit upon said box, and is maintained between a shoulder 46 and a ring 47 provided on the box. This mode of mounting permits rotation of the device, while preventing its displacement in a longitudinal direction.

The pinion 45 is driven by a worm 8 which transmits to it the motion of the machine or of the organ to be controlled. The rotation of the pinion 45 causes rotation of the cam 44 which is integral therewith and produces a displacement of the pencil 24 in any suitable manner as, for instance, in the structural form illustrated, through the medium of a lever 48 bearing upon the cam 44 by means of a ball 48′, and oscillating freely around an axis 49 carried by the case. This lever acts upon a pencil holding cross beam 50, carrying the pencil 24, and sliding upon guiding posts 51. The cross beam 50 and the pencil 24 is constantly urged downwards, either by gravity alone, or by the combined action of gravity and of springs 52. As a result lever 48 is constantly maintained against the periphery of the cam 44.

The operation of this apparatus will be readily understood from the following explanation.

The worm 8, rotates the pinion 45, and, consequently, the cam 44, at a speed, which is proportional to that of the organ or machine to be controlled. Whenever the cam completes a revolution, it causes the pencil holding cross beam 50 to effect a reciprocating stroke, through the medium of the lever 48, said numbers assuming, successively, the positions shown by full lines and by pick and dot lines. Also, at the same time, the clock work imparts to the disc 39 a rotary motion of uniform speed, whereby the pencil traces a line on the disc, the appearance of which is similar to that of the teeth of a circular saw as shown in Fig. 6, the top angle of the teeth being more acute according as the cam rotates faster. When the cam remains stationary, the pencil draws an arc of a circle having its center situated on the axis of rotation of the disc, the length of which arc is proportional to the duration of the rest period of the cam.

With the apparatus above described, can be combined a device to put the disc into position in the morning for example, and to change it only the next morning, that is, twenty-four hours later, although the disc can be divided into twelve hour portions, of course, like the dial of a clock. Indeed, without the intervention of the device which will now be described if the disc were not immediately changed after the end of a given period, the pencil would continue to draw lines over the diagram already drawn.

In order to avoid this defect, a lever 53, provided with a slot 54 in one of its ends, embraces, by such end, and by any suitable means is attached to, the shank of the pencil 24 and bears upon a collar 55 on the pencil. This lever pivots on an axis 56 mounted into a stirrup integral with a washer 57, forming a partition, the washer being fastened upon the edge of the stop ring 47, and being of a size exactly corresponding to the internal diameter of the case.

The other end 59 of lever 53 is constantly urged by an expansion spring 58, against an abutment formed by a small bar 60, fastened in any suitable manner upon a spring blade 61. Said bar (Fig. 5) preferably has the shape of the upper bar of a T and is engaged against a notch provided in the lever 53, to transfer near to the longitudinal axis of the lever, the strain of the spring 58.

Upon the bar 60 is fastened a head 62 which lies in the path of a buttom 63 secured to the flange 40 which holds the disc 39.

When the button 63 strikes the head 62, it presses it laterally, bending the flexible blade 61 until the bar 60 is pushed beyond the edge of the lever 53 to thus free the lever. The lever, owing to the pressure of the spring 58, pivots around its axis, thus bringing the pencil away from the disc and forcing it into the pencil holding cross beam 50, wherein it remains housed until the lever 53 has been recocked.

It is obvious that the arrangement of the parts 62 and 63 is such that the part 63 meets the part 62 only at the end of a desired period.

It is to be noted that the washer 57, forming a partition, completely covers the mechanism, into which, therefore, the dust cannot penetrate during changing of the disc 39, and the mechanism is furthermore protected against all fraudulent intervention.

Claim:

A recorder of the character described, comprising a rotatable record sheet, means for rotating the record sheet, a marking device, and means for actuating the marking device, in combination with an automatically acting spring pressed pivoted lever for moving the marking device away from the record sheet, after a predetermined period of operation of the recorder.

In testimony whereof, I have signed my name to this specification.

GEORGES DESENNE.